3,152,091
PROCESS FOR PREPARING ALUMINA-BASED CATALYSTS

John L. Gring, Homewood, Ill., assignor, by mesne assignments, to Sinclair Research Inc., New York, N.Y., a corporation of Delaware
No Drawing. Filed Feb. 24, 1959, Ser. No. 794,855
16 Claims. (Cl. 252—464)

My invention relates to a process for the manufacture of catalysts and more particularly to a process for the manufacture of catalysts useful for instance in hydrodesulfurization, hydrogenation, hydroforming and hydrocracking processes.

Catalysts which have been used in hydroforming include various metals such as platinum and palladium and oxides or sulfides of Group VI metals, particularly moylbdenum, chromium, vanadium and tungsten. These catalysts are normally supported on a base or spacing agent preferably upon a high surface area alumina-containing composition such as activated alumina.

A great many alumina based catalysts have been employed in various chemical reactions. These catalysts have as the carrier or base material some form of alumina and their activity and aging characteristics in a given reaction are due not only to the catalytically-active component deposited on the base but also due to the association of the catalytically-active component with this particular base material. Although such catalysts have shown effectiveness in many reactions, they are particularly useful in hydrocarbon conversion reactions conducted in the presence of free hydrogen and to a lesser extent in oxidation reactions. Typical of reactions conducted in the presence of free hydrogen are hydrogenation, dehydrogenation, hydrosulfurization, hydrocracking, hydrorefining and hydroforming. Feeds charged to these reactions are commonly petroleum-derived hydrocarbons.

There have been a number of methods described for preparing alumina based catalysts. Alumina particles in undried form or after partial or complete drying or even after calcination have been impregnated with aqueous salt solutions to add one or more components which will enhance catalytic activity. Frequently a dried or calcined alumina is impregnated with a solution of one component, re-dried, impregnated a second time to increase the percentage of the component or to introduce a second component, and again dried. Even more than two impregnations are sometimes used. These methods have disadvantages. For instance, the water-soluble salts employed are frequently expensive as compared with the costs of salts of low water solubility which, due to their solubility characteristics, generally find less use in the chemical industry. Frequently the soluble salt is in the form of a nitrate and upon subsequent heating of the dried material noxious and corrosive nitrogen compounds are evolved which necessitate special equipment and represent a potential hazard to personnel.

Other anions introduced through use of the water-soluble catalytically active metal salts are equally disadvantageous. For example, chloride can be deleterious as it causes corrosion of processing equipment. To avoid these effects, operators have employed expensive and time-consuming washing operations to reduce the anion content. Also multiple impregnations, indicated above, require multiple dryings, thereby slowing production and increasing processing costs. Additions by impregnation may also result in higher percentage of components on some particles as compared to others.

When the catalytically active component is incorporated into the alumina structure, by precipitation, various reagents have been employed as precipitants. Invariably these extraneous agents include undesirable catalyst constituents. For example, if a basic precipitant be employed, such as sodium hydroxide, sodium ions are introduced which may poison the catalyst, while if an acidic precipitant be employed the undesirable anions are present. Unless contaminating ions are subject to removal by heating during calcination, washing procedures are usually employed; however, it is sometimes difficult to wash without also partially removing a desired component.

In another method of preparing these catalysts precipitation of the alumina base and of the catalytically active component is effected simultaneously. This method is equally disadvantageous as those employing a preformed base and water-soluble salts, since the undesirable and poisoning cations and anions are again introduced which necessitates considerable water washing. Thus, all of these methods of preparing alumina based catalysts are disadvantageous in that they require relatively expensive reagents and complicated processing equipment which in many instances must be specifically designed for the particular catalyst manufactured.

In the present invention I have discovered that valuable catalysts containing certain catalytically active metal components can be prepared by the sequence of intermixing suitable chemicals, tabletting, contacting the tablets with water in the liquid or vapor phase apparently to cause interaction of two or more of the catalyst components, and completing to form a catalyst. My invention is directed toward a process which includes the mixing of alumina in hydrate or calcined form with one or more substantially water-insoluble inorganic compounds of a catalytically-active metal. The metal compounds are usually oxides, hydroxides, and/or carbonates of catalytically active metals. I then tablet the mixture, heat the resulting tablets in the presence of water and then dry and calcine the tablets to give the useful catalysts.

This process is adapted for readily changing the ratio of the catalyst components. The catalyst composition may be easily altered in such a manner as to be suitable for the specific needs of various reaction systems. Further the catalyst of my process exhibits exceptional desulfurization and denitrogenation characteristics even though the relatively inexpensive, substantially water-insoluble metal compounds are employed.

The catalytically active metals which are mixed with the alumina base of this invention include metals of the iron transition group, i.e., cobalt, nickel and iron; the metals of the fifth and sixth period of Group VIb, i.e., molybdenum and tungsten, and vanadium and their various combinations. These metals are used as the substantially water-insoluble compounds such as the carbonates, oxides and hyroxides; thus undesirable extraneous ions need not be introduced into the catalyst. Useable forms of these compounds include the bicarbonates, basic carbonates, and hydrated oxides. Each added metal component on the base will be an amount sufficient to afford a substantial catalytic effect and will frequently comprise about 0.1 to 10 weight percent of the catalyst, but the metal components may be up to about 30 weight percent or more of the total catalyst composition. As examples of these catalysts which exhibit the desired characteristics are those which have nickel, molybdenum, tungsten, or their combinations deposited on the alumina base. The alumina base can be any of the hydrate forms such as the monohydrate or trihydrate; for instance, an effective base comprises up to about 95% of trihydrate and about 5 to 100% of other hydrous aluminas in the form of alumina monohydrate, e.g., boehmite, as detected by X-ray analysis after drying or in the form of amorphous hydrous alumina or mixtures of these forms. A preferred base contains about 10 to 50% of the trihydrate and about 90 to 50% of the amorphous or monohydrate forms. The alumina base can contain minor amounts usually up to about 25% of promoting or stabilizing constituents as, for instance, silica, titania, zirconia, thoria, etc. Other hydrogenation catalysts include those which on the alumina base have, for instance, nickel, cobalt-molybdena, nickel-molybdena, iron-nickel-molybdena, cobalt, molybdena, nickel-tungsten or nickel-vanadia.

Frequently, I employ a nickel or cobalt hydroxide, oxide or carbonate which may be in hydrate form. The selected constituent is then added along with a compound such as $MoO_3$ or $WO_3$ to alumina which may contain minor amounts of other materials such as silica or other inorganic oxides. The selected components are then mechanically or dry mixed in a blender or the like until substantially uniform. The mixed material is then tabletted to the desired size and strength. A preferred catalyst upon tabletting may be in a particle size of about 1/16" x 1/16" to about 1/2" x 1" with the preferred dimensions being about 1/16" to 1/8" x 1/16" to 1/8". The tablets are then subjected to contact with water, for instance water in the liquid phase or an atmosphere of steam or one containing appreciable steam, at a temperature of at least about 150 to 175° F. for a period of at least about one-half an hour. The contacting with water may continue as long as desired but is usually not longer than about 10 hours. The contact time may be up to about 24 hours or more as long as the contacting is not continued so long as to deleteriously affect the strength of the tablets to a material extent. A temperature up to about 300° F. or more may be used with a preferred temperature being about 175° to 250° F. Thus, the interaction of the tabletted mixture may be promoted by steeping in hot water or steam. When using liquid phase water the tablets are usually immersed in the water. After contact with water the tablets are dried and calcined by usual means such as by the use of an air-atmosphere electric muffle. After tabletting if desired one can employ stage calcining in a tunnel kiln with a zoned humidity control which promotes interaction in the first stage and changes the conditions in order to calcine in the latter. The temperature suitable for calcination is usually in the range from about 800° to 1200° F. or more to insure the presence of the alumina as γ-modifications.

The preferred catalysts of my invention are made from hydrated cobalt carbonate, molybdenum trioxide and alumina microspheres. A suitable water-soluble solid component such as powdered sucrose may be incorporated in a minor amount into the alumina-metal compound mixture before tabletting, as water digestion normally causes these components to dissolve with useful voids resulting in the tabletted product. Molybdenum sulfide may be used as a minor component in the production of my catalyst in order to lubricate the tabletting die. Molybdenum sulfide greatly increases the efficiency of tabletting dies without resulting in harm to the catalysts of my invention.

The following specific examples will serve to illustrate the present invention, however, they should not be considered as limiting.

EXAMPLE I 595 grams of alumina hydrate microspheres equal to 439 grams of $Al_2O_3$ were placed into a Twincone blender into which was added 36 grams of $MoO_3$, 30 grams of $CoCO_3$, and 9 grams of $MoS_2$. The constituents were then mixed for 3½ hours until a uniform blend was achieved. The material was then tabletted to about 1/8" x 1/8" size in a Stokes rotary unit. The tablets had an average crushing strength of 13 to 14 pounds. Quantities of these tablets were placed within a Pyrex tube in a vertical furnace where the contents were heated to about 220° F. Then nitrogen and steam were passed for a period of 4 hours up through the bed of tablets. Due to condensation and increasing back pressure the temperature gradually rose to about 240° F. then the steam and nitrogen source was stopped and the temperature was held at about 240° to about 250° F. until the free water evaporated. After oven drying, the tablets were calcined in an air-atmosphere electric muffle at a temperature of about 1050° F. for a 2½ hour period. The product had a crush strength of 19.6 pounds per 1/8" L.

Other catalysts are made by this procedure except that nickel carbonate replaces cobalt carbonate in an equimolar amount and tungsten oxide or vanadium pentoxide similarly replaces the molybdenum trioxide. These metals could also be in their hydroxide forms.

EXAMPLE II 595 grams of alumina hydrate microspheres equal to 439 grams of $Al_2O_3$ were placed into a Twincone blender into which was added 36 grams of $MoO_3$, 30 grams of $CoCO_3$, and 9 grams of $MoS_2$. The constituents were then mixed for 3½ hours until a uniform blend was achieved. The material was then tabletted to about 1/8" x 1/8" size in a Stokes rotary unit. The tablets had an average crushing strength of 13 to 14 pounds. The tablets were then digested in water for about 4 hours at a temperature of from 180° F. to 212° F. and then dried and calcined at about 1050° F. for 2½ hours. The average crushing strength of the product was about 16.7 pounds per 1/8" L. The analysis of this catalyst indicated 2.4% cobalt by weight and 8.5 molybdenum trioxide by weight.

EXAMPLE III 322 grams of alumina hydrate, 13.6 grams of cobalt carbonate, and 22.5 grams of molybdenum trioxide are physically admixed until generally uniform and then mixed with Sterotex die lubricant. The mixture is then tabletted to about 1/8" x 1/8" size and calcined for 6 hours in air at 900° F. in an electric muffle furnace which was brought to calcination temperature in 3 hours.

The following data shows the results of a hydrodesulfurization test conducted at 3 WHSV, 450 p.s.i.g., 680° F. and 3500 cubic feet per barrel recycle gas containing predominantly free hydrogen using the cobalt-molybdena-alumina catalysts of the above examples with a catalytically cracked light cycle oil containing 1.5% S; 0.04% N; and having a 10% boiling point of 500° F., and a 90% boiling point of about 630° F.

*Table I*

| Catalyst | Percent Desulfurization | Percent Denitrogenation |
|---|---|---|
| Ex. I | 84.7 | 23 |
| Ex. II | 86.8 | 24 |
| Ex. III | 42.8 | 5 |

The above data shows a marked improvement in desulfurization and denitrogenation in catalysts prepared by my process when compared with another catalyst of similar constituency but made by a procedure omitting my water-treating step.

I claim:

1. In a method of preparing alumina based catalysts the steps comprising dry mixing alumina with a catalytic amount sufficient to afford a substantial catalytic effect of a substantially water-insoluble inorganic component selected from the group consisting of oxides, hydroxides and carbonates of a metal selected from the group consisting of the iron transition metals, the metals of the fifth and sixth periods of Group VIb, vanadium and mixtures thereof, tabletting the resulting dry mixture, heating the tablets in the presence of water at a temperature of about 150° to 300° F. for a period of at least about one-half an hour, drying and calcining the water treated tablets at a temperature of at least about 800° F.

2. The process of claim 1 wherein the temperature during heating is from about 175° to 250° F.

3. The process of claim 1 wherein MoS$_2$ is added to the mixture prior to tabletting.

4. The method of claim 1 wherein the substantially water-insoluble component selected from the group consisting of oxides, hydroxides and carbonates consists essentially of cobalt and molybdenum compounds.

5. The method of claim 1 wherein the step of heating the tablets in the presence of water is carried out with the tablets immersed in water.

6. In a method of preparing alumina based catalysts the steps comprising dry mixing catalytic amounts sufficient to afford a substantial catalytic effect of cobalt carbonate and molybdenum trioxide and alumina, tabletting the resulting dry mixture, heating the tablets in the presence of water at a temperature of about 150 to 300° F. for a period of a least about one-half an hour and calcining the water-treated tablets at a temperature of at least about 800° F.

7. The process of claim 6 wherein the temperature during heating is from about 175° to 250° F.

8. The process of claim 7 wherein MoS$_2$ is added to the mixture prior to tabletting.

9. In a method of preparing alumina based catalysts the steps comprising dry mixing alumina with a catalytic amount sufficient to afford a substantial catalytic effect of about 0.1 to about 30 weight percent of a substantially water-insoluble inorganic component selected from the group consisting of oxides, hydroxides and carbonates of a metal selected from the group consisting of the iron transition metals, the metals of the fifth and sixth periods of Group VI$b$ and vanadium and mixtures thereof, tabletting the resulting dry mixtures, heating the tablets in the presence of water at a temperature of about 150° to 300° F. for a period of a least about one-half an hour, drying and calcining the water-treated tablets at a temperature of at least about 800° F.

10. The process of claim 9 wherein the temperature during heating is from about 175° to 250° F.

11. The process of claim 9 wherein MoS$_2$ is added to the mixture prior to tabletting.

12. The method of claim 9 wherein the substantially water-insoluble component selected from the group consisting of oxides, hydroxides and carbonates consists essentially of cobalt and molybdenum compounds.

13. The method of claim 9 wherein the step of heating the tablets in the presence of water is carried out with the tablets immersed in water.

14. In a method of preparing alumina based catalysts the steps comprising dry mixing alumina with a catalytic amount sufficient to afford a catalytic effect of about 0.1 to about 30 weight percent of cobalt carbonate and molybdenum trioxide, tabletting the resulting dry mixture, heating the tablets in the presence of water at a temperature of about 150 to 300° F. for a period of at least about one-half an hour, drying and calcining the water-treated tablets at a temperature of at least about 800° F.

15. The process of claim 14 wherein the temperature during heating is from about 175° to 250° F.

16. The process of claim 15 wherein MoS$_2$ is added to the mixture prior to tabletting.

References Cited in the file of this patent

UNITED STATES PATENTS

| | | |
|---|---|---|
| 2,378,155 | Newsome et al. | June 12, 1945 |
| 2,573,726 | Porter et al. | Nov. 6, 1951 |
| 2,698,305 | Plank et al. | Dec. 28, 1954 |
| 2,881,051 | Pingard | Apr. 7, 1959 |
| 2,897,161 | Erickson | July 28, 1959 |
| 2,908,655 | Keith | Oct. 13, 1959 |
| 2,982,719 | Gilbert et al. | May 2, 1961 |